United States Patent [19]

Akiyama et al.

[11] Patent Number: 4,816,921
[45] Date of Patent: Mar. 28, 1989

[54] DOCUMENT READING APPARATUS

[75] Inventors: Yoshihiro Akiyama, Yao; Kiyohito Miwa, Osaka; Yoshihito Urata, Katano; Toshiharu Sasaki, Kawanishi, all of Japan

[73] Assignee: Matsushita Electric Industrial Co., Ltd., Osaka, Japan

[21] Appl. No.: 841,460

[22] Filed: Mar. 19, 1986

[30] Foreign Application Priority Data

Mar. 20, 1985 [JP] Japan .................................. 60-54358

[51] Int. Cl.$^4$ ......................... H04N 1/00; H04N 1/04; H04N 1/10
[52] U.S. Cl. .................................. 358/256; 358/280; 358/285; 358/293
[58] Field of Search ............... 358/293, 236, 280, 285, 358/286; 355/14 R

[56] References Cited

U.S. PATENT DOCUMENTS 4,275,423 6/1981 Takahashi et al. .

FOREIGN PATENT DOCUMENTS 57-38065 3/1982 Japan .
57-180269 11/1982 Japan .
58-43657 3/1983 Japan .
58-141075 8/1983 Japan .

OTHER PUBLICATIONS

Patent Abstracts of Japan, vol. 6, No. 107 (E-113) [985], Jun. 17, 1982, JP-A-5738065 (Canon K.K.) Mar. 2, 1982.
IBM Technical Disclosure Bulletin, vol. 23, No. 2, Jul. 1980, pp. 666, 667, New York, U.S.; J. F. Hevesi: "Analog Data Tablet".
IBM Technical Disclosure Bulletin, vol. 23, No. 1, Jun. 1980, pp. 278-281, New York, U.S.; E. L. Walker: "Unified Read/Write Panel".
Nikkei Electronics, (Sep. 10, 1984), pp. 161-194.
Nikkei Computer, (Oct. 14, 1985), pp. 75-91.

Primary Examiner—Edward L. Coles, Sr.
Attorney, Agent, or Firm—Wenderoth, Lind & Ponack

[57] ABSTRACT

The present invention provides a document reading apparatus having a document placing plate and a transparent flat plate which hold a document with a surface to be read directed upward, a sensor unit for reading image information of an image on the document surface to be read through the transparent flat plate, a drive mechanism for driving the sensor unit in a direction parallel with the flat plate, and a position entering unit for indicating an arbitrary position on the document surface to be read by a visible light through the transparent flat plate and for detecting the position in association with a transparent tablet. Image reading and position entry can be made with a document held in the apparatus.

29 Claims, 7 Drawing Sheets

DOCUMENT READING APPARATUS

BACKGROUND OF THE INVENTION

1. Field of the Invention

The present invention relates to a document reading apparatus for reading an image on a document, used as an image input device for an image processing system such as an image processing computer, a high-speed facsimile, an electronic filing system, and an intelligent copier system.

2. Description of the Prior Art

With the recent spread of digital networks, there have been proposed various types of intelligent copier systems, digital facsimiles, and electronic filing systems. For reading an image on a document in such systems, there are often required not only the entry of image information, but also the entry of image position at the same time.

A document scanning system for converting the image information on a document into electric signals and a tablet input device for entering the position information on a document are known. For example, in the document reading apparatus as shown in Nikkei Electronics, Vol. No. (Sept. 10, 1984), pages 161-194 or the image processing system as shown in Nikkei Computer, Vol. No. (Oct. 14, 1985), pages 75-91, image information is once stored in a memory device such as a semiconductor memory, and then edited on a display device such as a CRT with the use of a tablet or a mouse. In such system, however, the image on the CRT may be turned upside down due to a document placing error, or the vertical and horizontal directions of a document may not be coincident with those of the image on the CRT. As disclosed in Japanese Laid-Open Patent Application No. 57-38065 or No. 57-180269, there is also known a system in which a tablet is switchingly connected to a document reading means. However, this system has such defects that position entry cannot be made for thick books because, as already known, the tablet is useful only for a thin document due to its low effective reading height, and that a positional shift may occur because a document surface to be read is pressed after the position information has been entered. Also, systems in which a document surface to be read is placed face upward are known as a hand scanner, or as disclosed in the Japanese Laid-Open Patent Applications No. 58-43657 and No. 58-141075. In these systems, a document surface to be read is placed upward so that the placed position can be visually checked, but position entry cannot be made.

SUMMARY OF THE INVENTION

In view of the foregoing, it is an object of the present invention to provide a document reading apparatus capable of reading image information of an image on a document and entering position information of the same in real time with the document held on a document placing plate.

In order to achieve this object, the apparatus in accordance with the present invention comprises document holding means for holding a document with a surface to be read directed upward, image reading means, for reading an image on the document, and position entering means for entering a position of the image on the document, the reading means and the position entering means being disposed at the same side with respect to the holding means. Preferably, the image reading means is disposed between the document holding means and the position entering means. The position entering means preferably has light projecting means for projecting a visible light to form a light spot on the document surface. The document holding means preferably has plane defining means for flattening the document surface, and means for pushing the document against the plane defining means so that the document surface is pushed onto the plane defining means in a direction substantially perpendicular to the document surface.

With the above arrangement, a document can be placed while visually checking the surface to be read, thereby to eliminate document placing errors. Since the document is pressed in the direction substantially perpendicular to the surface to be read, even a thick book can be accurately held. Pages of a book can be turned with the book remaining placed on the apparatus, thereby to eliminate the necessity to move the heavy book for changing the pages. Moreover, the image information and the position information on the document surface to be read can be entered with the document held, thereby to eliminating positional shift as often occurred in the conventional system at each time the document is moved. Regardless of the thickness of the document, a position on the document surface can be designated. In particular, the user can recognize the position desired to be designated from the light spot on the document surface. By automatically detecting the position on the document surface at a place remote from the document surface, the user can enter the position while directly indicating the position on the document surface to be read. Such entry method is direct and very convenient for the user, as compared with the conventional method in which a read image is once stored and later edited while entering the position information on a display device such as a CRT. In other words, the apparatus of the present invention can eliminate the necessity for a memory device and a display device having a capacity more than the read information, which have been indispensable for the conventional editing operation. Thus, compared with the conventional apparatus having the same function, the apparatus of the present invention is more compact and more inexpensive. Further, when a movable portion of the image reading means is disposed between the document holding means and the position entering means, the image reading means can be hermetically sealed so as to be free from contamination. Since there is no possibility of the user touching the movable portion, the movable portion can be designed to be high-speed, thus enabling a high-speed document reading.

The above and other objects and features of the invention will be apparent from the following description taken in connection with the accompanying drawings in which:

DESCRIPTION OF THE PREFERRED EMBODIMENTS

Figure 1:
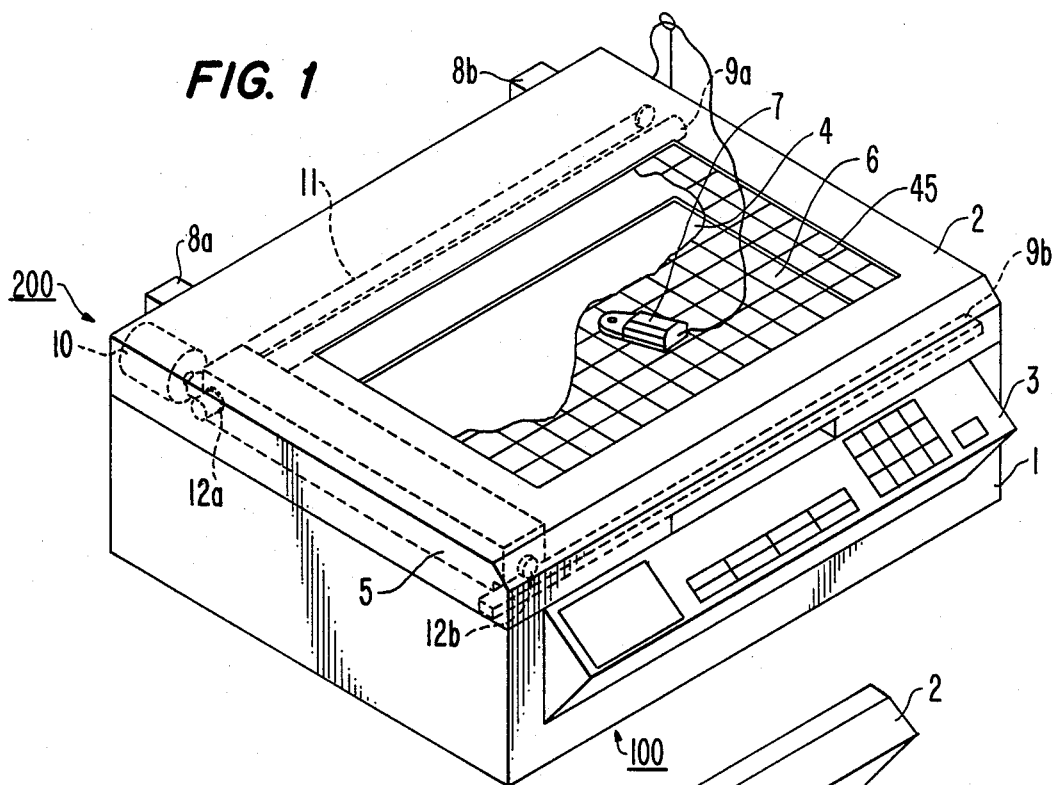
FIG. 1 is a schematic perspective view of an embodiment of the document reading apparatus according to the present invention.
Figure 2:
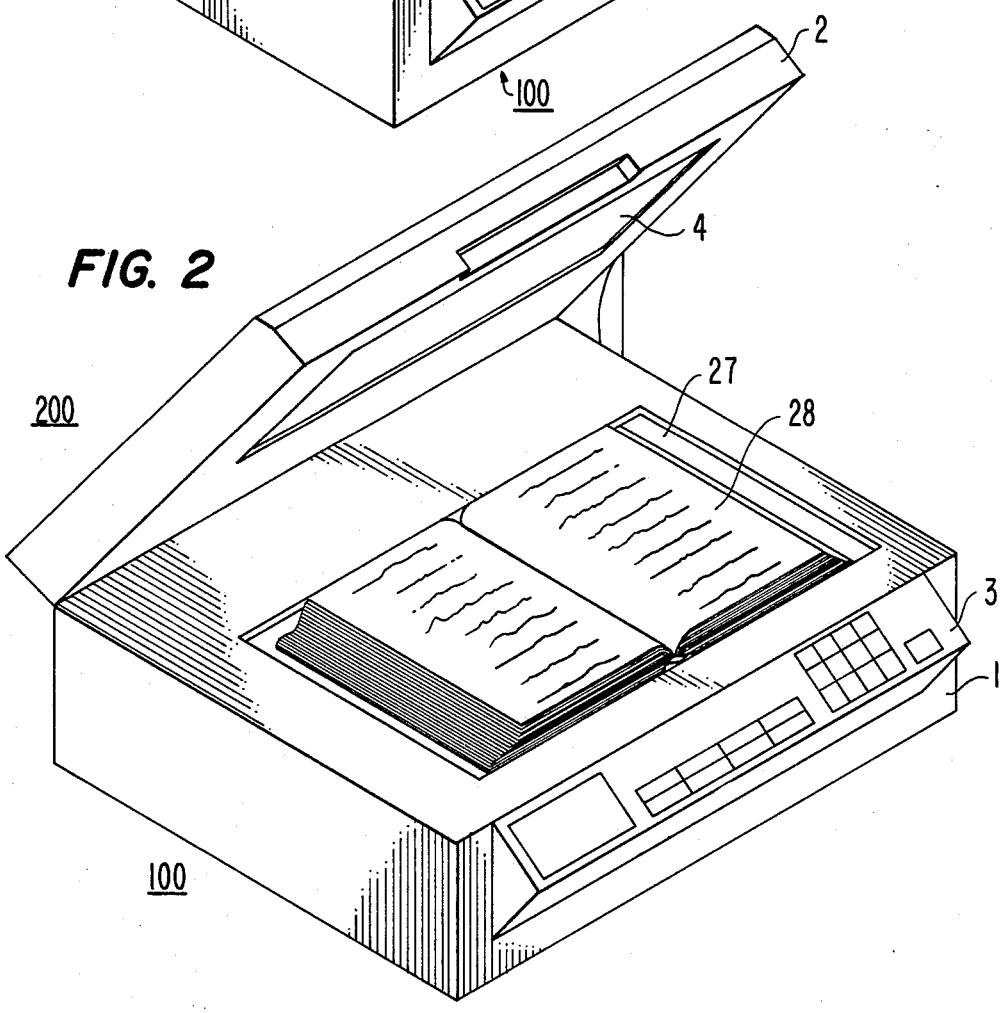
FIG. 2 is a schematic perspective view showing an upper unit of the apparatus in FIG. 1 opened and a book placed on a lower unit.
Figure 3:
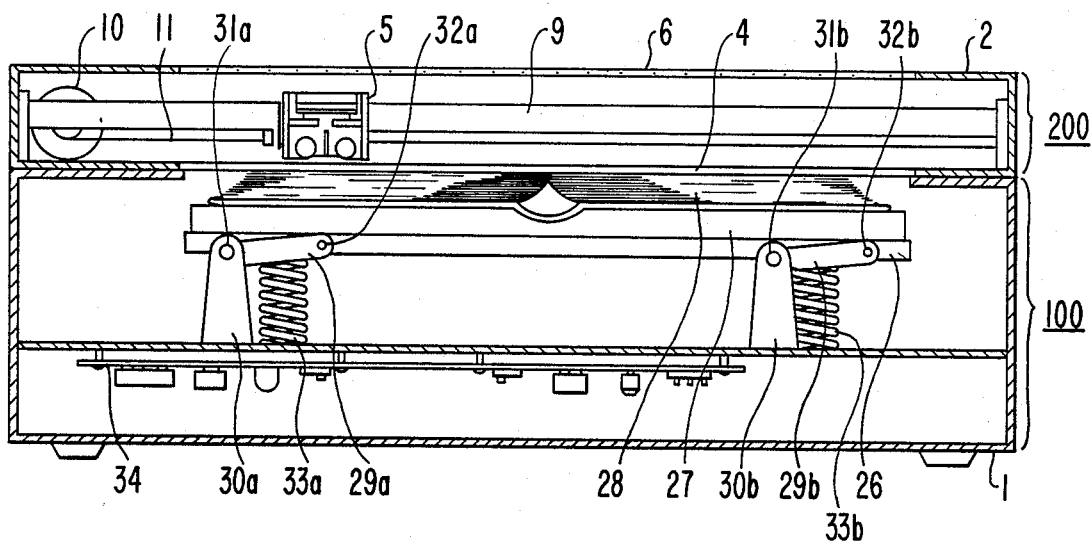
FIG. 3 is a sectional view showing an example of internal structure of the apparatus in FIG. 1.

FIG. 1 shows an embodiment of the document reading apparatus of the invention, comprising a lower unit 100 and an upper unit 200. FIG. 2 shows the apparatus of FIG. 1 in a condition with the upper unit 200 opened and a document (a book) 28 placed with a surface to be read directed upward on the lower unit 100. FIG. 3 shows a sectional view of the apparatus of FIG. 1 in a condition with the upper unit 200 closed so that the document 28 is in a position to be read.

Referring to FIGS. 1 to 3, the basic structure of the apparatus will be described.

The lower unit comprises a base 1 and a control panel 3 provided on the base 1 for being operated by an operator. The upper unit 200 comprises a frame 2, a transparent tablet 6 supported by the frame 2 to form an upper surface of the upper unit 100, and a transparent plate 4 supported by the frame 2 to form a lower surface of the upper unit 100. The upper unit 200 is connected at its rear portion to the rear portion of the lower unit 100 by hinges 8a and 8b so as to be opened and closed with respect to the lower unit 100.

A sensor unit 5 for reading image information is disposed in the upper unit 200 and reciprocally movable along guide rails 9a and 9b within a space between the tablet 6 and the transparent plate 4. The sensor unit 5 is coupled to the guide rails 9a and 9b via bearings 12a and 12b, respectively. The sensor unit 5 is driven by a motor 10 via a driving wire 11 extended in parallel with the guide rail 9a. These movable portion—the sensor unit 5, the motor 10 and the driving wire 11—with the guide rails 9a and 9b is hermetically sealed within the space covered by the frame 2, the transparent tablet 6 and the transparent plate 4 so as to be free from dust. The internal structure of the sensor unit 5 will be described later.

A position indicating unit 7 will be moved on the transparent tablet 6 by an operator so as to indicate a position on an image on the document 28. The position indicating unit 7 and the tablet 6 will be described later.

Referring to FIG. 3, the document 28 is pressed between the transparent plate 4 and an elastic member 27 provided on a document placing table 26. The surface to be read of the document 28 to be read is made flat by contacting the lower surface of the transparent plate 4. Fixed pins 32a and 32b mounted on a side surface of the document placing table 26 are loosely coupled to parallel links 29a and 29b, respectively, which are loosely coupled to support members 30a and 30b, respectively, which are fixed to the base 1. The document placing table 26 is urged upward, or in a direction perpendicular to the lower surface of the transparent plate 4, while keeping its horizontal position, by pressure springs 33a and 33b so that the document 28 is pressed onto the lower surface of the transparent plate 4. Thus, the surface to be read of the document 28 to be read is kept flat. A control circuit board 34 has thereon control circuitry for controlling various elements in the apparatus as will be described later.

As described above, the document 28 is held by the transparent plate 4 and the document placing table 26 with the associated members. The sensor unit 5 moves in parallel with the flattened document surface while scanning the flattened document surface to read the image information thereon.

Figure 4:
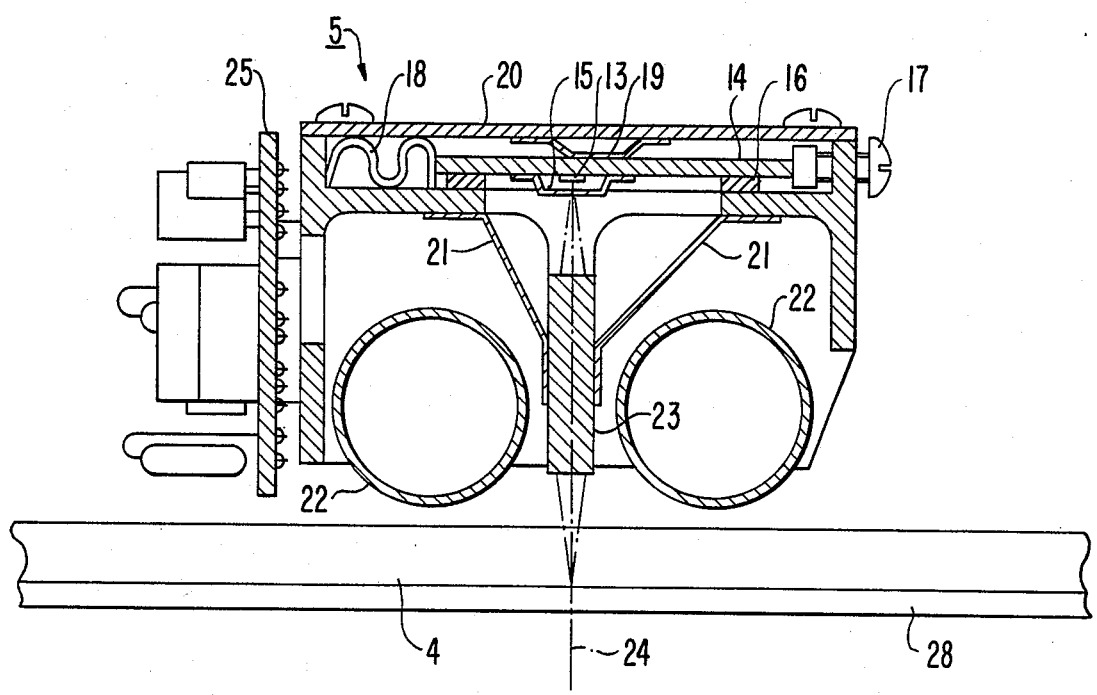
FIG. 4 is a sectional view showing an example of a sensor unit used in the apparatus of the present invention.

FIG. 4 shows an example of the internal structure of the sensor unit 5. Light sources 22 such as fluorescent lamps irradiate the document surface under the transparent plate 4. A reflected light containing image information from the document surface is converged by an equi-magnification type rod lens array 23 onto a photoelectric conversion element 13 which produces an electric signal corresponding to the image information. The electric signal will be amplified at a preamplifier circuit board 25. A cover 20 covers the photoelectric conversion element 13 and other associated members. The photoelectric conversion element 13 is mounted on an alumina substrate 14 and covered by a protective transparent cover 15. The vertical position of the substrate 14 is defined by spacers 16 and a height adjusting spring 19. The lateral position of the substrate 14 is adjusted by an optical axis adjusting screw 17 and an optical axis adjusting spring 18 so as to adjust the optical axis 24 of the photoelectric conversion element 13. Shield plates 21 are provided for shielding the photoelectric conversion element 13 against any light radiated from the light sources 22.

Figure 5:
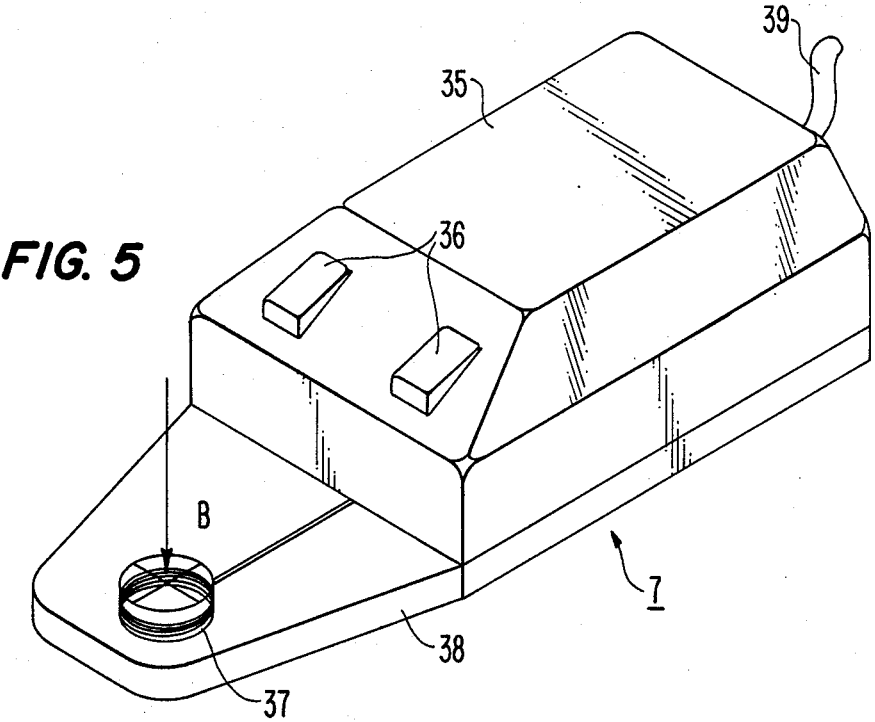
FIG. 5 is a schematic perspective view showing an example of a position indicating unit used in the apparatus of the present invention.

FIG. 5 shows an example of the position indicating unit 7, comprising a frame 35 having thereon point indicating switches 36, and a transparent scale plate 38 having mounted thereon a pickup coil 37. The position indicating unit 7 is electrically connected to the control circuit board 34 via a cable 39.

Figure 6:
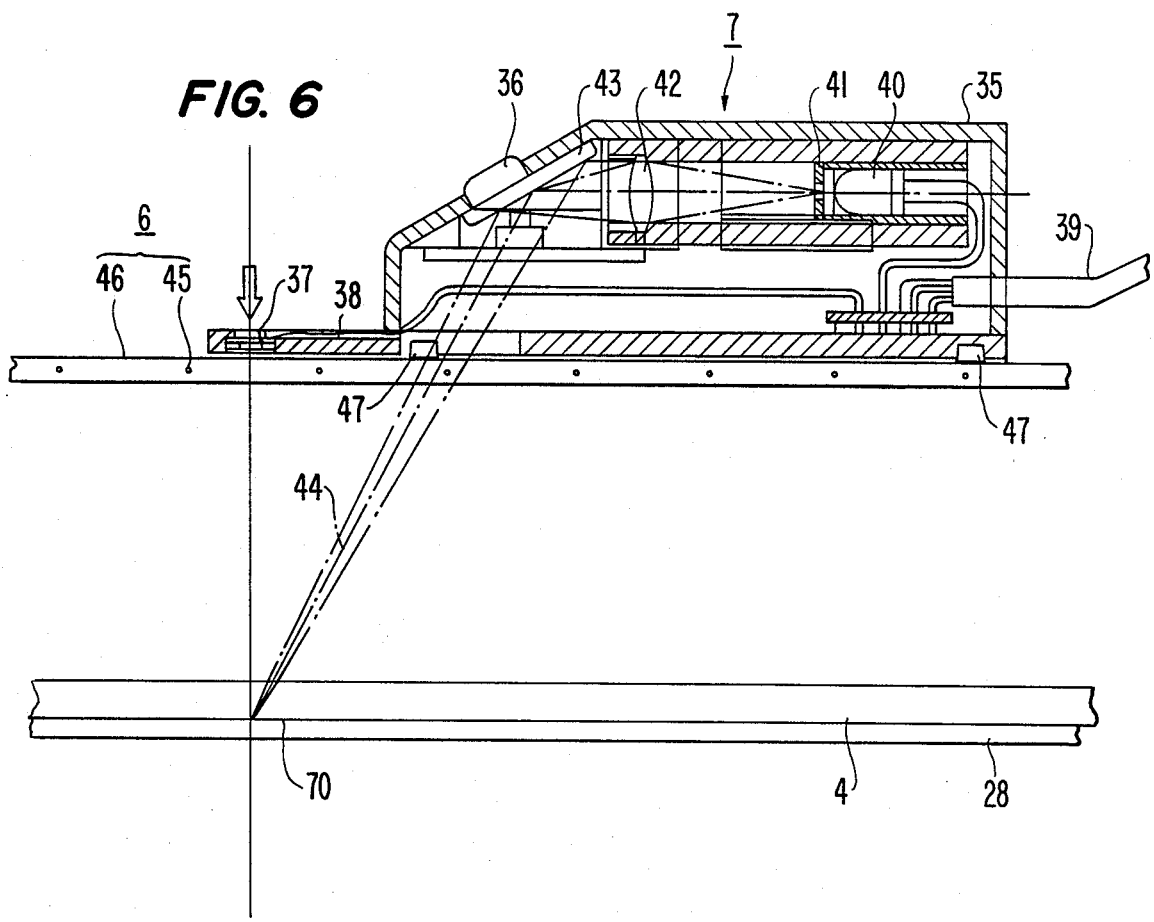
FIG. 6 is a sectional view of the position indicating unit in FIG. 5 placed in its operating condition.

FIG. 6 shows an internal structure of the position indicating unit 7 of FIG. 5 when placed on the transparent tablet 6. A visible light source 40 such as a visible light emitting diode emits a visible light which is passed through a focusing plate 41 having a pin hole, converged by a converging lens 42, reflected by a reflection mirror 43, and reaches the document surface through the transparent tablet 6 and the transparent plate 4 thereby to form a light spot 70 on the document surface. An operator can see the light spot 70 through the transparent scale plate 38 in a direction indicated by an arrow B so as to recognize the position where the light spot 70 is formed.

The transparent tablet 6 comprises a transparent plate 46 and a plurality of conductor wires 45 disposed in the transparent plate 46 and arranged in a network pattern as shown in FIG. 1. The plurality of conductor wires 45 constitute a position detector in association with the pickup coil 37 in a manner as disclosed in Japanese Laid-Open Patent Application No. 58-201187. The optical axis 44 of the visible light is so adjusted that the light spot 70 is positioned just below the pickup coil 37. The operator moves the position indicating unit 7 until the light spot 70 seen in the direction B comes to a desired position on the document surface, where the operator pushes one of the point indicating switches 36 so as to operate the position detector to detect a position corresponding to the desired position on the document surface. Reference numeral 47 shows a spacer roller for allowing the position indicating unit 7 to be freely movable on the tablet 6.

The document surface to be read, the transparent plate 4 for flattening the document surface and the transparent tablet 6 are parallel with one another when the document 28 is held in the apparatus. The sensor unit 5 moves in parallel with the document surface within the space between the transparent plate 4 and the transparent tablet 6. The position indicating unit 7 also moves in parallel with the document surface on the transparent tablet 6. With the above arrangement, indication of a desired position on the document surface, detection of the indicated position, reading of image information on the document surface and editing of the image information according to the detected position information can be performed in real time.

Figure 7A:
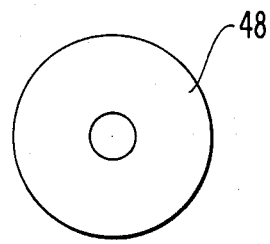
FIG. 7A is a plan view of an example of focusing plate used in the position indicating unit.
Figure 7B:
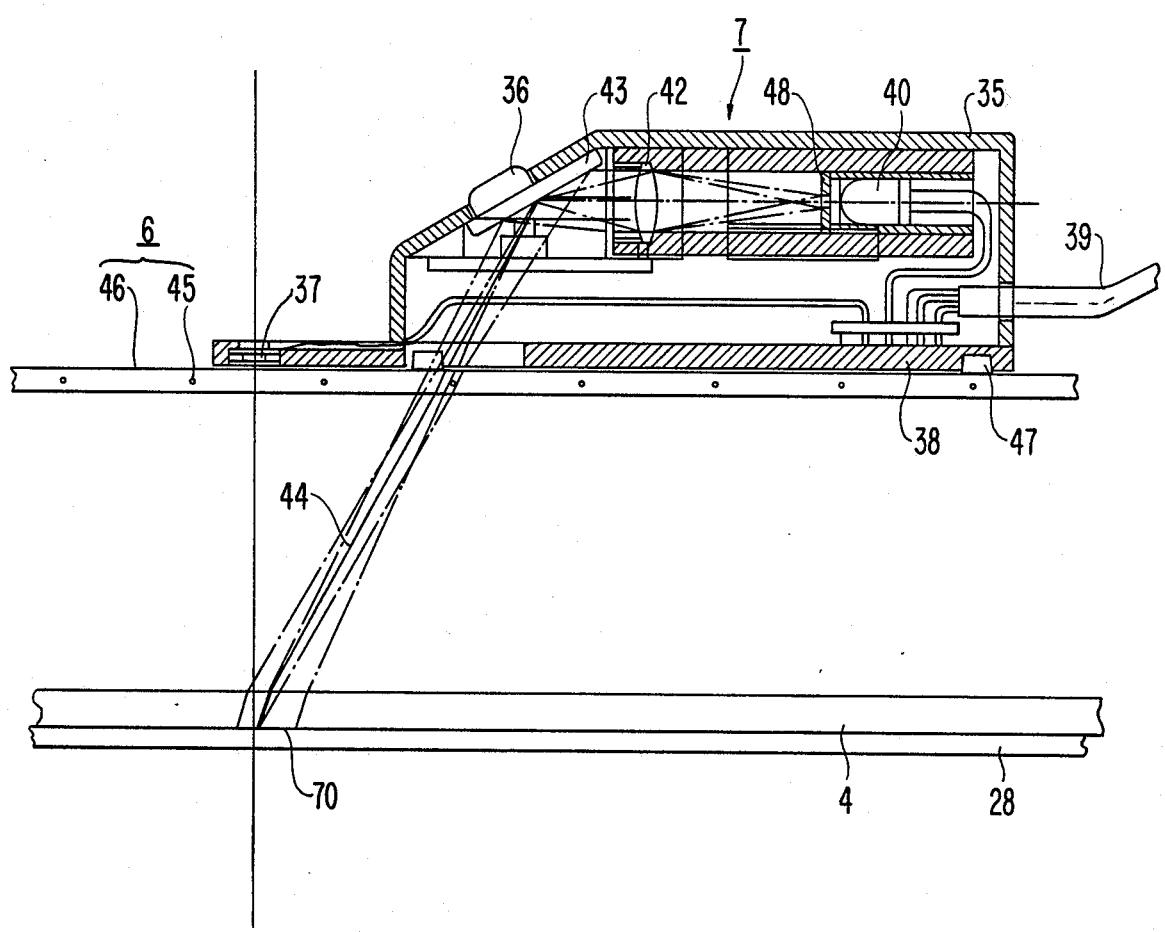
FIG. 7B is a sectional view of the position indicating unit using the focusing plate in FIG. 7A.

The focusing plate 41 having a pin hole in FIG. 6 can be replaced by a focusing plate 48 having at its center a hole with a cross grid as shown in FIG. 7A. FIG. 7B shows the position indicating unit 7 using the focusing plate 48. Since the focusing plate 48 passes larger quantity of light than the focusing plate 41, the area of the light spot 70 becomes larger and thus more easily visible.

Figure 8:
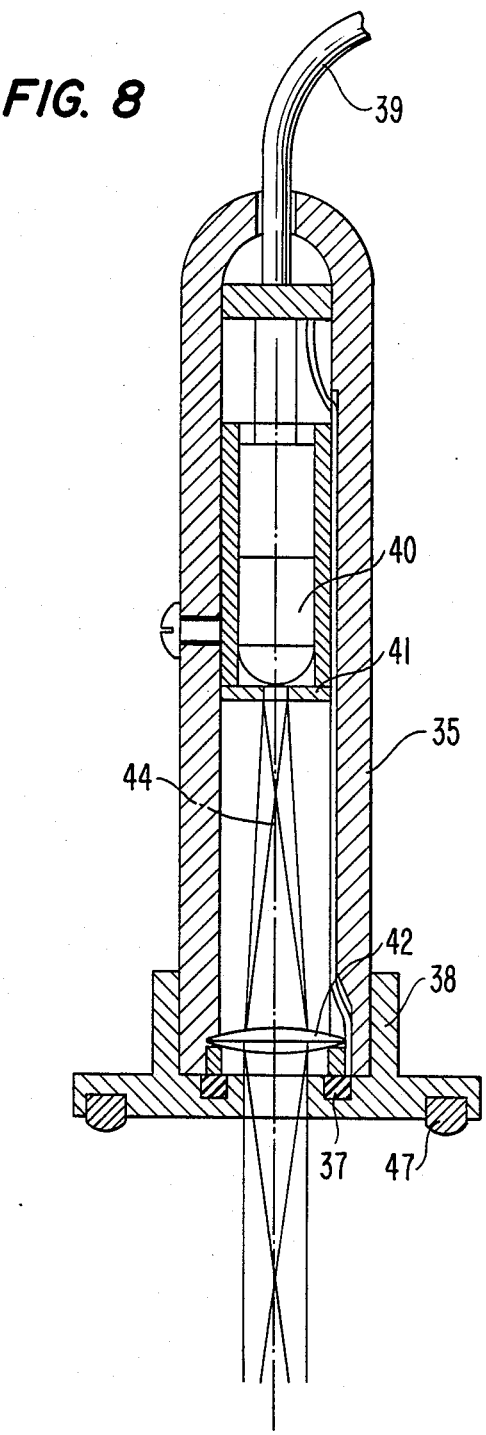
FIG. 8 is a sectional view showing another example of position indicating unit used in the apparatus of the present invention.

FIG. 8 shows another example of the position indicating unit 7. The frame 35 is formed in a cylindrical shape. The light emitted from the light source 40 is focused by the focusing plate 41 and converged by the converging lens 42 to form the light spot 70 (not shown in FIG. 8) on the document surface. Thus, the optical axis 44 of the light is on a straight line. The center of the pickup coil 37 is on the optical axis 44. The frame 35 is mounted on the transparent scale plate 38 having the spacer rollers 47 so as to keep the optical axis 44 perpendicular to the tablet 6 (not shown in FIG. 8), or to the document surface. The unit 7 in FIG. 8, compared with the unit 7 in FIG. 6, is superior in that the optical axis adjustment is easy since no mirror is used, that the error between the indicated position and the detected position is small, and that focus deviation of the light spot does not occur since the optical axis is perpendicular to the document surface, but is inferior in that the visibility of the light spot is reduced since the light spot is just below the frame 35.

Figure 9:
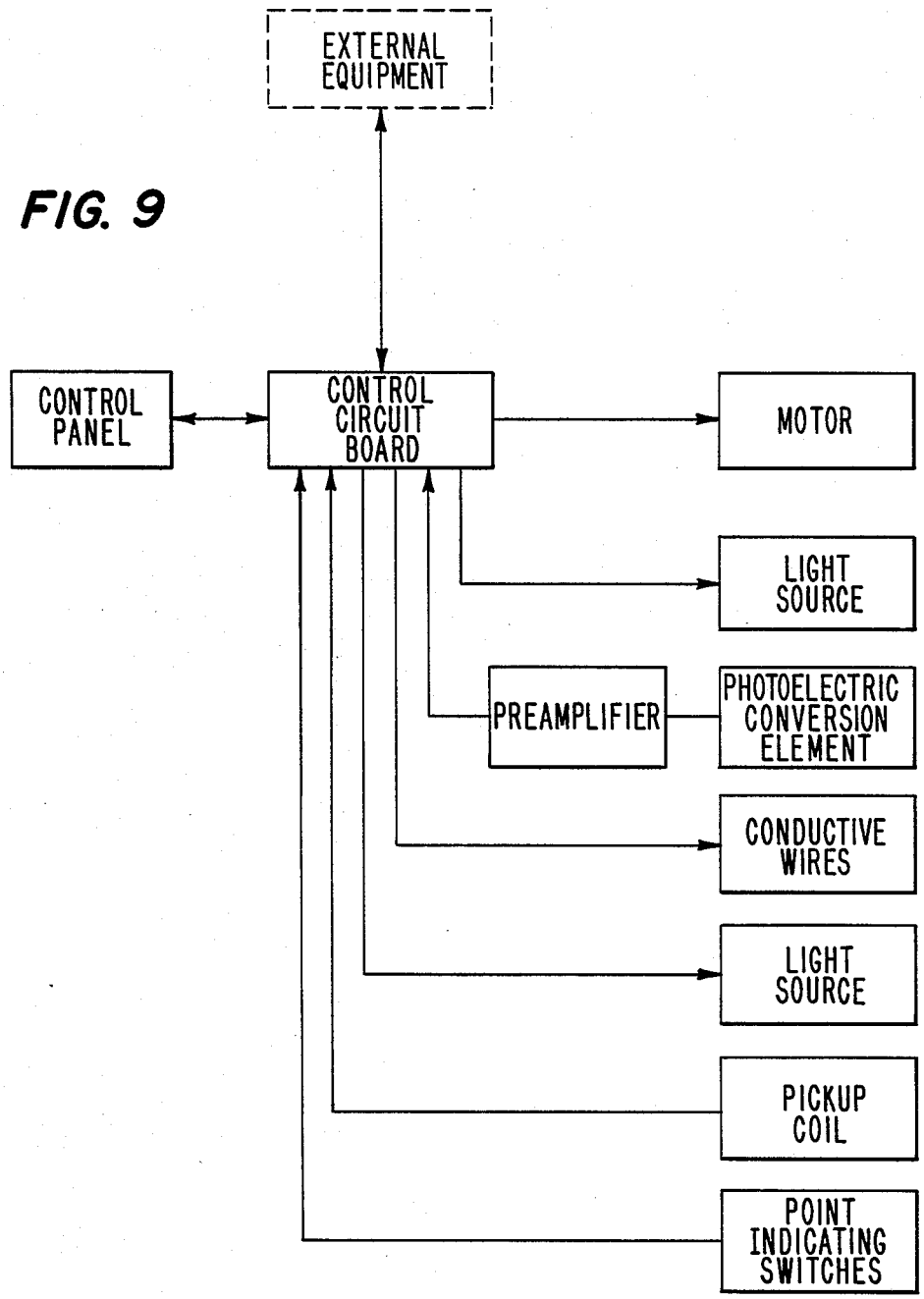
FIG. 9 is a block diagram showing the connections of a control circuit board with the other portions of the apparatus of the present invention.

FIG. 9 shows the connections between the control circuit board 34 and other elements in the apparatus. The control circuit board 34 controls the control panel 3, the motor 10 to rotate it, the light source 22 to turn it off and on, and the light source 40 to emit light, and supplies a scanning detecting current to the plurality of conductor wires 45. The image information signal produced by the photoelectric conversion element 13 is supplied to the control circuit board 34 after being amplified at the preamplifier circuit board 25. Control signals from the control panel 3, a position information signal produced by the pickup coil 37, and a signal from the point indicating switches 36 are also supplied to the control circuit board 34. The control circuit board 34 can also be connected also to external equipment. The actual circuit configuration of each of the blocks shown in FIG. 9 may be arbitrarily designed by known techniques according to desired performances.

Figure 10:
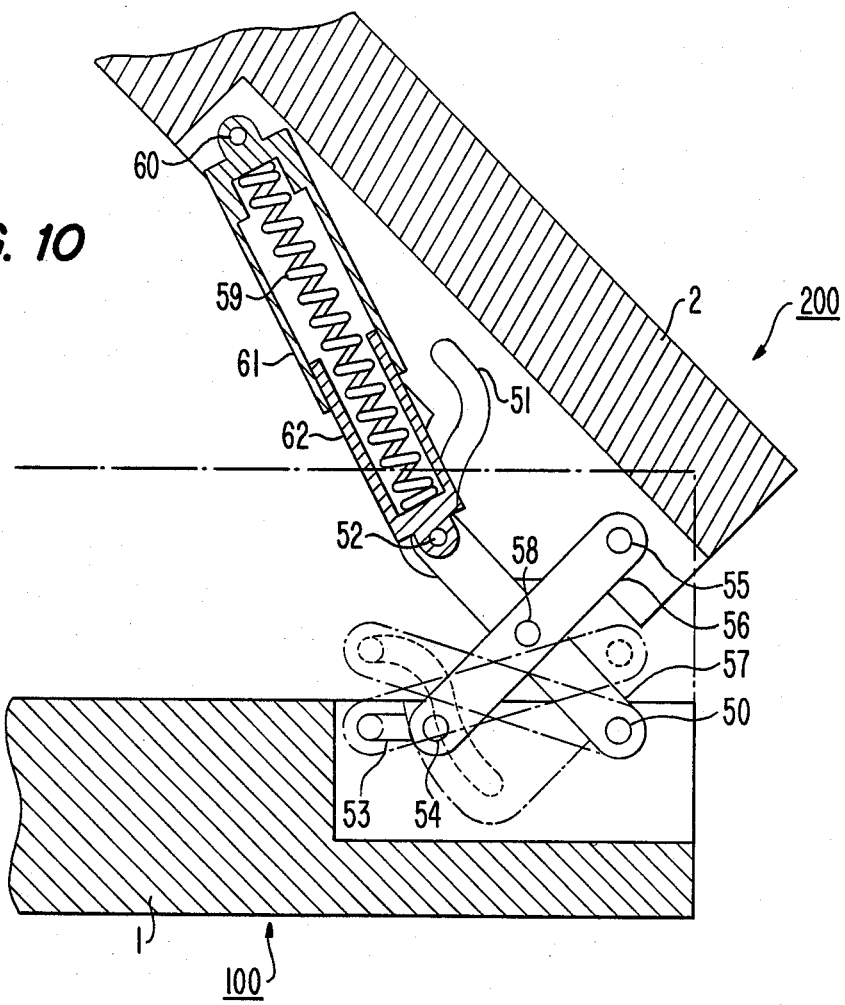
FIG. 10 is a sectional view showing an example of mechanism connecting the upper and lower units of the apparatus of the present invention.

FIG. 10 shows an example of the mechanism for coupling the lower unit 100 and the upper unit 200, in which the state shown by solid lines shows the state in which the frame 2 is opened upward with respect to the base 1, and the state shown by dot-and-dash lines shows the state in which the frame 2 is closed. Reference numeral 50 denotes a pin fixed to the base 1, 51 an elongated hole provided on the frame 2, 52 a pin movable along the elongated hole 51, 53 an elongated hole provided on the base 1, 54 a pin movable along the elongated hole 53, 55 a pin fixed to the frame 2, 56 a link for connecting the pins 54 and 55, 57 a link for connecting the pins 50 and 52, 58 a pin for movably connecting the links 56 and 57 at the centers thereof, 59 a pressure spring for balancing, 60 a pin fixed to the frame 2, 61 a spring holder rotatably mounted on the pin 60 and for holding one end of the spring 59, and 61 a spring holder rotatably mounted on the pin 52 and for holding the other end of the spring 59. In the state with the frame 2 is opened, the pins 52 and 54 are positioned at the rightmost ends of the elongated holes 51 and 53. The force due to the weight of the frame 2 acting in a direction to move the pin 52 toward the left-upper end of the elongated hole 51 via the link 57 and to move the pin 54 toward the left end of the elongated hole 53 via the link 56 is balanced by the counter force of the spring 59, so that the frame 2 is kept in the position shown by solid lines in FIG. 10.

When the frame 2 is pushed downward by an operator, the pin 52 moves in the left-upper direction along the elongated hole 51 and the pin 54 moves leftward along the elongated hole 53. Accordingly, the spring 59 is compressed and the links 56 and 57 rotate clockwise about the pin 58. The position of the frame 2 is determined by the positions of the pins 52 and 55. First, the frame 2 moves downward while rotating counterclockwise until the lower surface of the frame 2 becomes parallel to the upper surface of the base 1. Thereafter, the frame 2 further moves downward while keeping its horizontal position until the lower surface of the frame 2 comes into contact with the upper surface of the base 1, or in the state shown by dot-and-dash lines in FIG. 10. At this time, the pins 52 and 54 are positioned at the leftmost ends of the elongated holes 51 and 53, respectively, so that the force due to the weight of the frame 2 acting in the direction to urge the pin 52 becomes maximum which is balanced by the force of the spring 59 in its most compressed state.

With the mechanism as shown in FIG. 10, the operator can easily open or close the upper unit 200 without being conscious of the weight of the frame 2. Further, since the upper unit 200 moves vertically while keeping its horizontal position near the document placed on the lower unit 100, the document surface will not be shifted laterally when contacted by the transparent plate 4 at the bottom of the upper unit 100.

Figure 11:
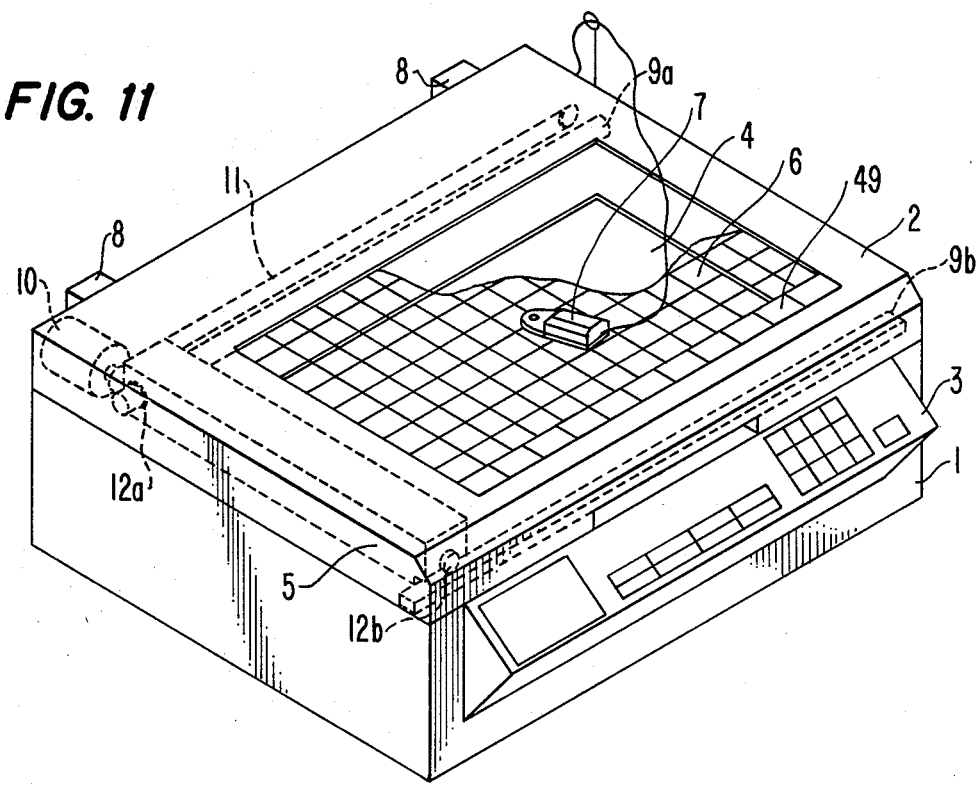
FIG. 11 is a schematic perspective view of another embodiment of the apparatus according to the present invention.

FIG. 11 shows a modified embodiment of the document reading apparatus of the invention, in which an edit command input area 49 is provided on the tablet 6. On the edit command input area 49 are displayed various commands for specifying such things as the number of readings, area to be read, position of binding margin of a book, opening side (left or right) of a book, movement of a read image, and the destination to which to send a read and edited image (a G3 or G4 facsimile network, a printer, a pattern recognition device, an optical disk, etc.). A desired command can be inputted by placing the position indicating unit 7 so that the pickup coil 37 is positioned above an area in which the desired command is displayed of the edit command input area 49 and pushing one of the switches 36 on the unit 7. Therefore, an operator can control the apparatus only by using the position indicating unit 7 without operating the switches on the control panel 3.

It should be understood that the above-described embodiments and examples are only for explanatory of the invention, and thus various changes and modifications can be made within the scope of the invention. For example, the sensor unit 5 may be comprised by a photoelectric conversion element such as a CCD (charge coupled device) and a reduction lens, or by a perfect contact type photoelectric conversion element without an optical system. The light source 22 may be a LED (liquid crystal display) array, a halogen lamp, a hot-cathode tube or a cold-cathode tube. The motor 10, the driving wire 11 and the guide rail 9 may be replaced by a linear motor. The mechanism shown in FIG. 10 may be replaced by another combination of links or a combination of a vertically movable feed screw mechanism and a rotational hinge. The transparent plates may be glass plates or plastic plates or others. The document placing table may be moved by a compressed air or a motor instead of the mechanism as shown in FIG. 3. The internal structure of the position indicating unit 7 may be a laser or any other structure for projecting a visible light beam.

What is claimed is:

1. A document reading apparatus comprising:
    document holding means or holding a document with a surface to be read directed upward;
    image reading means for reading image information of an image on the surface to be read of the document; and
    position entering means for entering position information of the image on the surface to be read of the document,
    said image reading means and said position entering means being disposed on the same side of said document holding means, and
    said position entering means including a transparent position detector plate, position indicating means adapted to indicate an arbitrary position on the document surface, and position detecting means adapted to detect a position on said position detector plate corresponding to the position on the document surface indicated by said position indicating means.

2. The apparatus as set forth in claim 1, wherein said position detector plate is adapted to be parallel with the document surface when the position information is entered.

3. The apparatus as set forth in claim 1, wherein said position indicating means includes a light emitting element for emitting a visible light, and condensing means for condensing the light from said light emitting element onto the document surface to form a light spot.

4. The apparatus as set forth in claim 1, wherein said position indicating means includes a light emitting element for emitting a visible light, condensing means for condensing the light from said light emitting element onto the document surface, and a focusing plate between said light emitting element and said condensing means.

5. The apparatus as set forth in claim 1, wherein said position detecting means is supported by said position indicating means.

6. A document reading apparatus comprising:
    document holding means for holding a document with a surface to be read directed upward;
    image reading means for reading image information of an image on the surface to be read of the document; and
    position entering means for entering position information of the image on the surface to be read of the document,
    wherein said image reading means is disposed between said document holding means and said position entering means.

7. The apparatus as set forth in claim 6, wherein said image reading means includes document illuminating means, means for photoelectrically converting light reflected from the document surface to an electric signal, guide means for movable supporting said illuminating means and said photo-electrically converting means for movement in parallel with the document surface, and drive means for driving said illuminating means and said photoelectrically converting means along said guide means.

8. The apparatus as set forth in claim 6, wherein said position entering means includes a transparent position detector plate, position indicating means adapted to indicate an arbitrary position on the document surface means, and position detecting means adapted to detect a position on said position detector plate corresponding to the position on the document surface indicated by said position indicating means.

9. The apparatus as set forth in claim 8, wherein said position detector plate is adapted to be parallel with the document surface when the position information is entered.

10. The apparatus as set forth in claim 8, wherein said position indicating means includes a light emitting element for emitting a visible light, and condensing means for condensing the light from said light emitting element onto the document surface to form a light spot.

11. The apparatus as set forth in claim 8, wherein said position indicating means includes a light emitting element for emitting a visible light, condensing means for condensing the light from said light emitting element onto the document surface, and a focusing plate between said light emitting element and said condensing means.

12. The apparatus as set forth in claim 8, wherein said position detecting means is supported by said position indicating means.

13. A document reading apparatus comprising:
    a lower unit for supporting thereon a document with a surface to be read directed upward;
    an upper unit movable toward and away from said lower unit and having a plane defining means for flattening the document surface;
    means for movably connecting said upper unit with said lower unit;
    image reading means provided in said upper unit for reading image information of an image on the document surface; and
    position entering means provided on said upper unit for entering position information of the image on the document surface.

14. The apparatus as set forth in claim 13, wherein said position entering means comprises means for projecting a visible light which passes through said upper unit to form a light spot indicating an arbitrary position on the document surface, and means for detecting said arbitrary position.

15. The apparatus as set forth in claim 13, wherein said position entering means comprises a transparent position detector plate provided on an upper surface of said upper unit, means movable on said position detector plate and projecting a visible light which passes through said upper unit to form a light spot indicating an arbitrary position on the document surface, and means for detecting a position on said position detector plate corresponding to the arbitrary position on the document surface.

16. The apparatus as set forth in claim 15, wherein said detecting means is provided on said light projecting means.

17. The apparatus as set forth in claim 13, wherein said image reading means comprises document illuminating means, photoelectric conversion means for converting light reflected from the document surface into an electric signal, and means for moving said illuminating means and said conversion means in a direction parallel with the document surface.

18. The apparatus as set forth in claim 13, said plane defining means comprises a transparent plate provided on a lower surface of said upper unit.

19. The apparatus as set forth in claim 13, further comprising document pressing means provided in said lower unit for pressing the document against said plane defining means in an upward direction perpendicular to the document surface.

20. The apparatus as set forth in claim 19, wherein said document pressing means comprises a document supporting table having thereon a resilient member for supporting thereon the document, and means for urging said document supporting table in the upward direction while keeping the position of said table horizontal.

21. The apparatus as set forth in claim 13, wherein said connecting means comprises a hinge which is rotatable about an axis parallel to a side surface of said upper unit and is stoppable at any position within a rotatable range.

22. The apparatus as set forth in claim 13, wherein said connecting means comprises links each of which is rotatable and stoppable at any position within a rotatable range so that said upper unit is movable linearly in a direction perpendicular to the document surface when close to the document surface, movable rotatably when far from the document surface, and is stoppable at any position within a movable range.

23. A document reading apparatus comprising:
a lower unit for supporting thereon a document with a surface to be read directed upward;
an upper unit movable toward and away from said lower unit, said upper unit having a transparent tablet as its uppermost plate and a transparent plate as its lowermost plate;
means for movably connecting said upper unit with said lower unit;
image reading means provided in said upper unit for reading image information of an image on the document surface; and
position entering means movable on said transparent tablet for entering position information of the image on the document surface in association with said transparent tablet.

24. The apparatus as set forth in claim 23, wherein said position entering means comprises means for projecting a visible light which passes through said transparent tablet and said transparent plate to form a light spot indicating a desired position on the document surface, and means for detecting a position on said tablet corresponding to the desired position on the document surface in association with said tablet.

25. The apparatus as set forth in claim 23, wherein said image reading means comprises: a sensor unit comprising a light source for illuminating the document surface and a photoelectric conversion element for converting light reflected from the document surface into an electric signal, said sensor unit being movable within a space between said with the document surface; and means for moving said sensor unit. transparent tablet and said transparent plate in parallel 26. The apparatus as set forth in claim 23, wherein said connecting means connects said upper unit in such a manner that said upper unit is movable vertically while keeping said transparent plate parallel with the document surface when close to the document surface.

27. The apparatus as set forth in claim 23, further comprising document pressing means provided in said lower unit for vertically pressing the document against said transparent plate so that the document surface to be read is flattened by the transparent plate.

28. The apparatus as set forth in claim 27, wherein said document pressing means comprises a document supporting table having thereon a resilient member for supporting thereon the document, and means for urging said document supporting table upwardly while keeping the position of said table horizontal.

29. The apparatus as set forth in claim 27, wherein said urging means comprises a spring.

* * * * *